United States Patent
Chen et al.

(10) Patent No.: US 6,182,220 B1
(45) Date of Patent: Jan. 30, 2001

(54) SYSTEM AND METHOD FOR BUILDING AND EXCHANGING ENCRYPTED PASSWORDS BETWEEN A CLIENT AND SERVER

(75) Inventors: Qilun Chen, Vestal; Thomas Edwin Murphy, Jr., Binghamton; Paul Francis Rieth, Apalachin; Jeffrey Scott Stevens, Endwell, all of NY (US)

(73) Assignee: International Business Machines Corporation, Armonk, NY (US)

( * ) Notice: Under 35 U.S.C. 154(b), the term of this patent shall be extended for 0 days.

(21) Appl. No.: 09/050,679

(22) Filed: Mar. 30, 1998

(51) Int. Cl.$^7$ ..................................................... H04L 9/32
(52) U.S. Cl. .............................................................. 713/182
(58) Field of Search .................................... 713/182, 183; 709/208; 380/255, 259, 262

(56) References Cited

U.S. PATENT DOCUMENTS

| | | | |
|---|---|---|---|
| 5,060,263 | 10/1991 | Bosen et al. | 380/25 |
| 5,200,999 | 4/1993 | Matyas et al. | 380/25 |
| 5,434,918 | 7/1995 | Kung et al. | 380/25 |
| 5,604,803 | 2/1997 | Aziz | 380/25 |
| 5,867,688 | * 2/1999 | Simmon et al. | 709/208 |

OTHER PUBLICATIONS

S. Alexander, ed. Network Working Group, *Telnet Environment* Option, Request for Comments RFC 1572, Jan. 1994, 7 pages.

Network Working Group, *Telnet Protocol Specification*, RFC 854.

* cited by examiner

*Primary Examiner*—Tod R. Swann
*Assistant Examiner*—Matthew Smithers
(74) *Attorney, Agent, or Firm*—Shelley M Beckstrand

(57) ABSTRACT

A method and system is provided for communicating encrypted user passwords from a client to a server. During new environment negotiations, the server communicates to the client a server random seed value. The client then generates a client random seed value and, using the client random seed value, the server random seed value, and the user variable name, an encrypted user password. The client then communicates to the server the client random seed, the user variable name and the encrypted user password. Then the server validates the encrypted user password using the server random seed, the client random seed and the user variable name.

11 Claims, 4 Drawing Sheets

SYSTEM AND METHOD FOR BUILDING AND EXCHANGING ENCRYPTED PASSWORDS BETWEEN A CLIENT AND SERVER

CROSS-REFERENCE TO RELATED APPLICATIONS

U.S. patent application Ser. Nos. 09/050,677, filed Mar. 30, 1998, entitled "System and Method for Negotiating Functions and Features", and 09/050,678, filed Mar. 30, 1998, now U.S. Pat. No. 5,946,465, entitled "Method and System for Recovering System Resources Used by an Inactive Telnet Client", filed concurrently herewith are assigned to the same assignee hereof and contain subject matter related, in certain respect, to the subject matter of the present application. The above-identified patent applications are incorporated herein by reference.

BACKGROUND OF THE INVENTION

1. Technical Field of the Invention

This invention relates access authorization in a network. More particularly, it relates to building and exchanging encrypted passwords between a client and a server.

2. Background Art

TCP/IP Telnet is an application that presents a terminal to a user. Normally, a user is required to sign-on to the Telnet application with a user name and a password. The sign-on will only proceed if a valid password has been received. Thus, the password is critical to gaining access to system functions and objects.

Many Telnet clients connect to a Telnet server and send both user name and password information in clear-text form. This means system security can be compromised by any tool that can read TCP/IP traffic which allows someone to detect the user name and password. Clear text passwords can be used by unscrupulous hackers to sign-on to a system to which they would not normally have access.

On the other hand, if the password were encrypted, then the Telnet server could use system functions to validate an encrypted password. An encrypted password is no good to a hacker, because an encrypted password is built dynamically using seeds and the real password. The real password is never sent over the TCP/IP network by the client. The real password is never seen by a hacker, and by the time a hacker sees the encrypted password it is no longer valid inasmuch as the real client will have already signed-on and subsequently invalidated the encrypted password.

Current Telnet design for TCP/IP networks is based upon the Internet standard RFC 854 Telnet Protocol Specification, among many others. Few of these RFCs provide a method to allow secure exchange of password information between client and server. With the explosion in Internet usage and associated privacy issues, a secure method to protect the user password from being sent across the Internet in unencrypted form is a critical issue for many businesses.

It is an object of the invention to provide an improved system and method for building and exchanging encrypted passwords.

It is a further object of the invention to provide a system and method usable within a TCP/IP Telnet application for building and exchanging encrypted passwords.

It is a further object of the invention to enable encryption by way of RFC 1572 negotiations.

SUMMARY OF THE INVENTION

A method and system is provided for communicating encrypted user passwords from a client to a server. During new environment negotiations, the server communicates to the client a server random seed value. The client then generates a client random seed value and, using both the client random seed value and the server random seed value, an encrypted user password. The client then communicates to the server the client random seed and the encrypted user password. Then the server validates the encrypted user password using both the server random seed and the client random seed.

Other features and advantages of this invention will become apparent from the following detailed description of the presently preferred embodiment of the invention, taken in conjunction with the accompanying drawings.

BEST MODE FOR CARRYING OUT THE INVENTION

Figure 1:
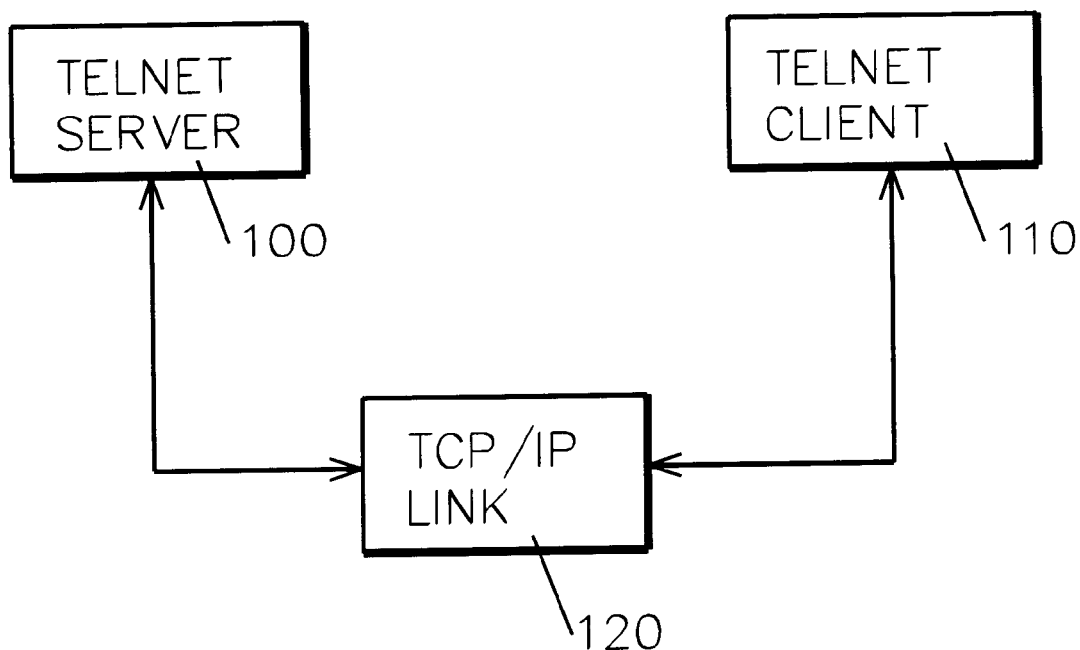
FIG. 1 illustrates a TCP/IP link interconnecting a Telnet server and a Telnet client.

Referring to FIG. 1, Telnet server 100 and Telnet client 110 are connected by TCP/IP link 120.

In accordance with a preferred embodiment of the invention, Telnet servers 100 and clients 110 exchange encrypted password information using the Telnet environment option variables described in RFC 1572. The RFC 1572 protocol adds Telnet environment negotiation options to the terminal session, and specifies such standard VAR type values as USER, JOB, ACCT, PRINTER, SYSTEM-TYPE and DISPLAY. This protocol can be extended for USERVAR type values.

In accordance with a preferred embodiment of the invention, by using the RFC 1572 protocol, both the client 110 and server 100 exchange seed and encrypted password information. In order to enable this operation, USERVAR variables are defined for building and exchanging encrypted passwords. These variables are IBMSUBSPW, which is the encrypted password (that is, substitute password) and SRVRSEED, which in communications from the server to the client is the server seed, and in communications from the client to the server is the client seed. This approach enables a Telnet server 100 to trust a particular Telnet client 110, and allow auto-signon for that client. This means that client 110 can store his password locally and automatically sign-on to a remote Telnet server 100 at will.

Figure 2:
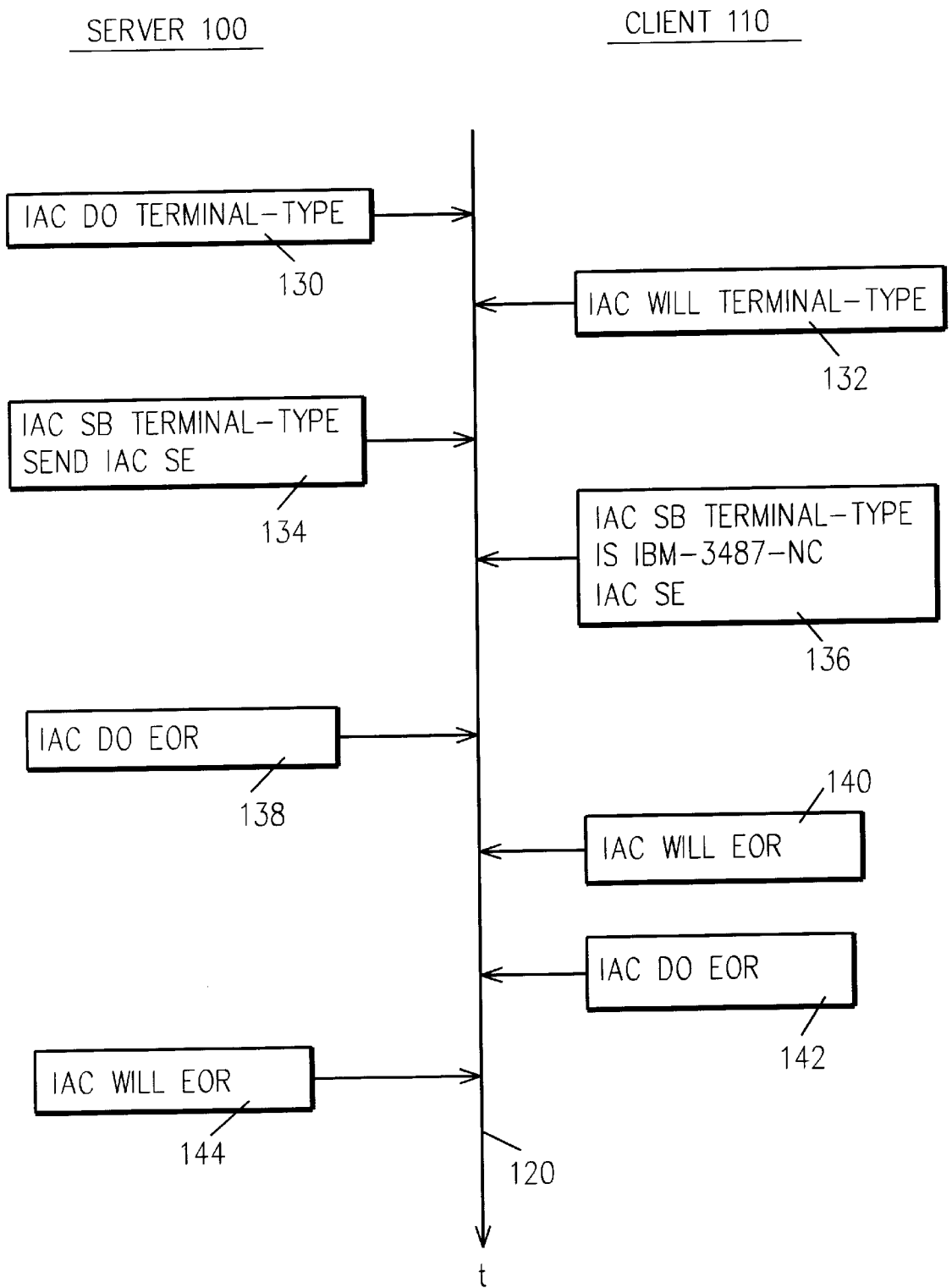
FIG. 2 illustrates Telnet client/server option negotiation.

Referring to FIG. 2, the process for negotiating environment options will be described. This typically begins with the issuance by server 100 in step 130 of DO TERMINAL-TYPE, which is an invitation to client 110 to engage in terminal type negotiations. Client 110 and server 100 then enter into a series of sub-negotiations to determine the level of terminal support that will be used. These include step 132 in which client 110 responds with WILL TERMINAL-TYPE, step 134 in which server 100 issues the SB TERMINAL-TYPE SEND command, which is a request that client 110 send the terminal type. To this, in step 136, client 110 responds with the terminal type.

After step 136, the terminal type is agreed upon, and client 110 and server 100 enter into negotiations for the remaining set of required options for supporting transparent mode, which can be full screen 5250/3270 block mode, VT100 mode etc.. These remaining required options include end of record EOR in steps 138, 140, 142 and 144, and thereafter (not shown) those options for BINARY mode and ECHO.

Some negotiations are symmetrical between client 110 and server 100 and some are negotiated in one direction only. Also, it is permissible and common practice to bundle more than one response or request, or combine a request with a response, so the actual exchange may look different in practice to that illustrated in FIG. 2.

Figure 3:
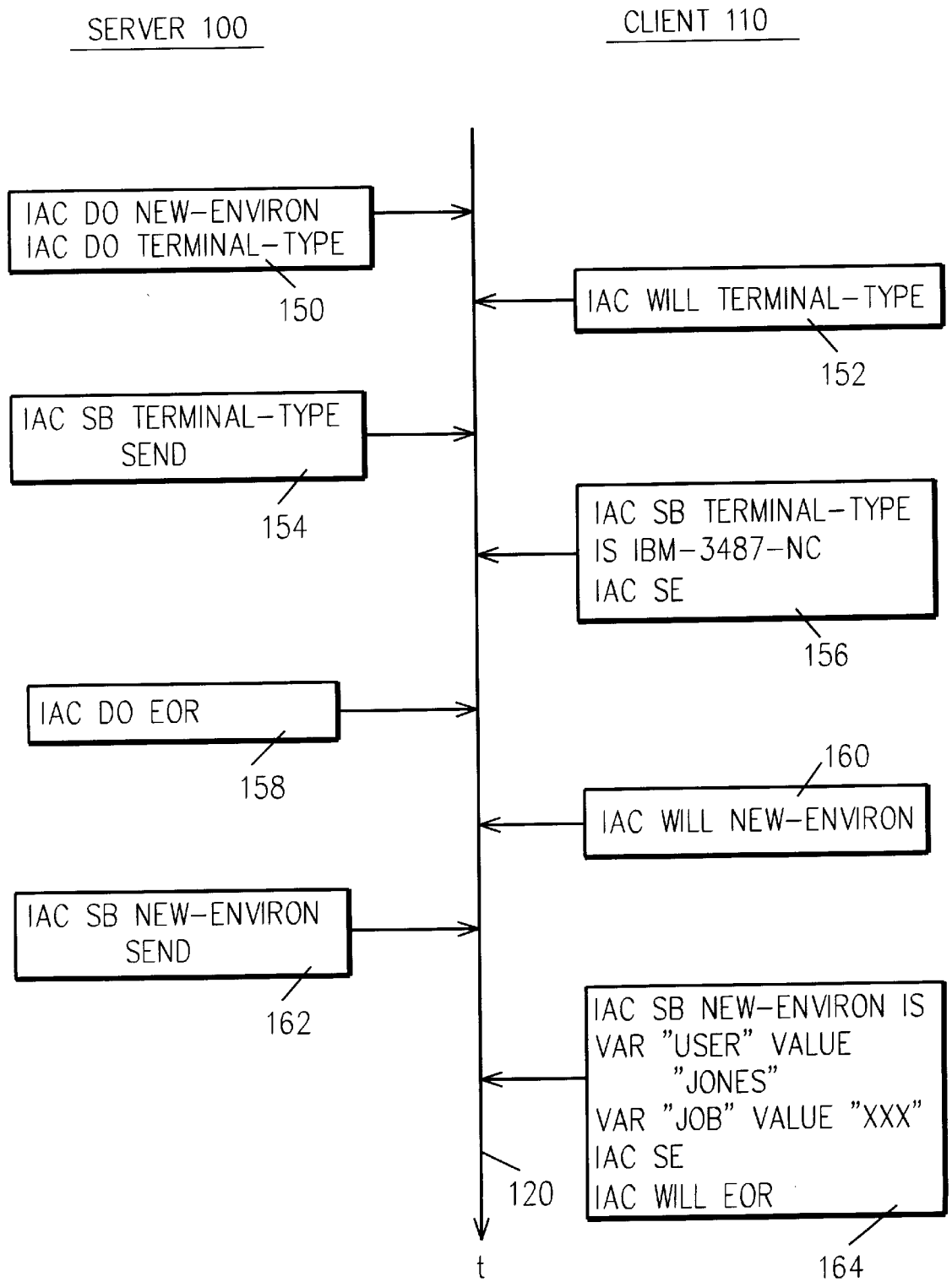
FIG. 3 illustrates extended Telnet client/server option negotiation.

Referring to FIG. 3, in order to accommodate new environment option negotiations, server 100 bundles in step 150 an environment option invitation DO NEW-ENVIRON along with the standard terminal type invitation request DO TERMINAL-TYPE to client 110.

Client 110 can either choose to ignore the new request altogether, send a negative acknowledgment WONT NEW-ENVIRON, or at some point after completing terminal type negotiations (illustrated here by steps 152, 154 and 156), but before completing the full set of negotiations required for transparent mode, engage in environment option sub-negotiation with server 100, as is represented by steps 160, 162 and 164. In greater detail, in step 150, server 100 bundles the two requests DO NEW-ENVIRON and DO TERMINAL-TYPE. In step 152, client 110 responds that it will do the terminal type sequence first. Terminal type negotiations are completed in step 156. In step 158, server 100 continues with normal transparent mode negotiations with DO EOR. In step 160, client 110 goes back to the deferred NEW-ENVIRON request and defers the DO EOR. In step 164, the new environment sub-negotiation completes.

RFC 1572 defines six standard variables (VARs): USER, JOB, ACCT, PRINTER, SYSTEMTYPE, and DISPLAY. The USER standard VAR holds the value of the user name to be used in auto-signon requests. In accordance with the present invention, however, AS400 Telnet server 100 makes no direct use of the additional five VARs, nor are any of them required to be sent.

Many clients, such as APPC and Client Access, use well-known DES encryption algorithms to create encrypted passwords. An intelligent workstation or enhanced client can generate compatible encrypted passwords if they follow the steps listed in the Data Encryption Standard (DES) described in Federal Information Processing Standards Publication 46, Data Encryption Standard, Jan. 15, 1977. This invention requires four additional values in order to generate a substituted pawword: (1) a server random seed, and (2) a client random seed, (3) a user variable name and (4) a plain text password. Examples of intelligent workstations, or enhanced clients, include the IBM Network Station, the IBM Client Access/400, and the IBM Personal Communications.

Referring to Table 1 USERVARS FOR PASSWORD ENCRYPTION, two server specific USERVARs are defined, in the context of RFC 1572. These are the random seed SRVRSEED for use in password encryption, and IBMSUBSPW for use in carrying the encrypted copy of the password. These enable the password and substitution schemes used in Advanced Peer-to-Peer Connection (APPC) and Client Access communications. Such schemes are described in the following URLs:

ftp://ftp.networking.ibm.com/pub/standards/ciw/sig/sec/pwsub ciw.ps;

ftp://ftp.nwtworking.ibm.com/pub/standards/ciw/sig/sec/pwsub ciw.ps.z and ftp://ftp.networking.ibm.com/pub/standards/ciw/sig/sec/pwsub ciw.zip.

TABLE 1

USERVARS FOR PASSWORD ENCRYPTION

| USERVAR | VALUE | EXAMPLE |
| --- | --- | --- |
| SRVRSEED | binary (64) | 8-byte hex field |
| IBMSUBPW | binary (64) | 8-byte hex field |

As previously noted, SRVRSEED contains the server seed in communications to the client and the client seed in communications to the server.

Figure 4:
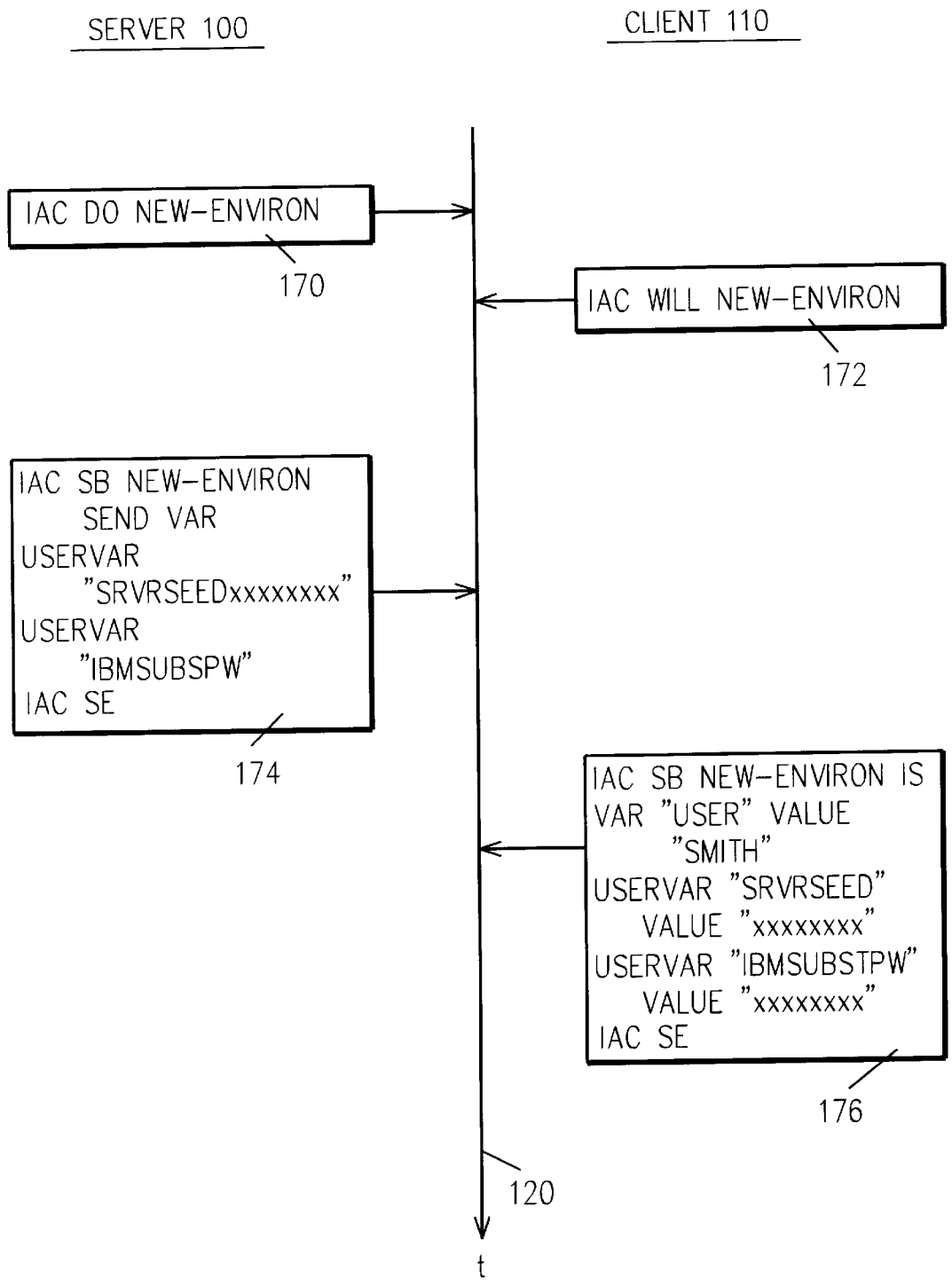
FIG. 4 illustrates enhanced display auto-sign on using password encryption in accordance with the method of the invention.

Referring to FIG. 4, in accordance with the invention, in order to communicate the server random seed value to client 110, server 100 in step 170 invites client 110 to engage in new environment negotiations. After client 110 indicates in step 172 that it will, in step 174 server 100 requests a USERVAR name made up of a fixed part, or command identifier (the eight characters SRVRSEED) immediately followed by an 8 byte hexadecimal variable part, a first xxxxxxxx, which is the server random seed. Client 110 generates its own 8 byte random seed value, a second xxxxxxxx value, and uses both random seeds (first xxxxxxxx and second xxxxxxxx values) to encrypt the password. In step 176, client 110 responds to server 100 with both the encrypted password IBMSUBSPW and the client random seed value SRVRSEED (second xxxxxxxx value) for authentication. RFC 1572 protocol is strictly adhered to when transmitting the client random seed and substitute password values to server 100, since a typical environment string is a variable length hexadecimal field. Specifically, the hexadecimal fields are required to be escaped and/or byte stuffed where any single byte could be mis-construed as a Telnet IAC or other Telnet option negotiation control character. The seeds and passwords exchanging process of the invention may be carried out in any programming language, such as Java, by performing the socket reads and writes set forth in steps 170–176.

By way of example of a specific implementation of the invention, consider a large chain of hospitals with thousands of patient's nurses using handheld wireless devices to read and update patient information stored on a central computer, such as an IBM AS/400 computer, using one of any number of 25,000 applications developed for the AS/400 and Telnet to access the application on the AS/400 across a wide area network (WAN), as distinguished from a local area network (LAN). Since each nurse running an application represents a job running on the AS/400, thousands of jobs constitute significant workload and resource contention on the AS/400, as further described in U.S. Pat. No. 5,946,465, the teachings of which are incorporated herein by reference. In accordance with the present invention, a nurse would sign-on securely to the device name used by the nurse, where the device name is the nurse name or ID number.

ADVANTAGES OVER THE PRIOR ART

The advantages of the method of the preferred embodiment of this invention include enabling encrypted password building and exchanging across a TCP/IP network.

The invention also provides a system and method usable within a TCP/IP Telnet application for building and exchanging encrypted passwords.

Also, the invention enables encryption by way of RFC 1572 negotiations.

ALTERNATIVE EMBODIMENTS

A complementary embodiment of this invention comprises a programmed general purpose computer. Such a computer is a well known article of commerce, such as the model AS/400 of the International Business Machines Corporation (IBM) or the System/390 of IBM, and is not described further.

It will be appreciated that, although specific embodiments of the invention have been described herein for purposes of illustration, various modifications may be made without departing from the spirit and scope of the invention. In particular, it is within the scope of the invention to provide a memory device, such as a transmission medium, magnetic or optical tape or disc, or the like, for storing signals for controlling the operation of a computer according to the method of the invention and/or to structure its components in accordance with the system of the invention.

Accordingly, the scope of protection of this invention is limited only by the following claims and their equivalents.

We claim:

1. Method for communicating encrypted user passwords from a client to a server, comprising the steps of:

during new environment negotiations, communicating from the server to the client a server random seed value;

generating at said client a client random seed value and, using said client random seed value, said server random seed value, said user variable name and an encrypted user password;

communicating from said client to said server said client random seed, said user variable name and said encrypted user password; and at said server, validating said encrypted user password using both said server random seed, said client random seed and said user variable name.

2. The method of claim 1, wherein a single user variable is used for communicating said server random seed and a request for said client random seed.

3. Method for encrypting and communicating a user password from a client system to a server system, comprising the steps of:

communicating from said server to said client an invitation to engage in new environment negotiations;

communicating from said client to said server a willingness to engage in new environment negotiations;

communicating from said server to said client a request for a user variable name, said request including a server seed;

operating said client to generate a client seed and, responsive to said user variable name, said user password, server seed and client seed, to form an encrypted password; and communicating from said client to said server said user variable name including said encrypted password, said client seed and said user variable name.

4. The method of claim 3, comprising the further steps of:

when communicating said server seed from said server to said client, associating said server seed with a first command identifier, and when communicating said client seed from said client to said server, associating said client seed with said first command identifier.

5. Method for encrypting and communicating a user variable name and a user password from a Telnet client system to a Telnet server system, comprising the steps of:

communicating from said Telnet server to said Telnet client a DO NEW-ENVIRON invitation;

communicating from said Telnet client to said Telnet server a WILL NEW-ENVIRON response;

communicating from said Telnet server to said Telnet client a sub-negotiation NEW-ENVIRON SEND invitation including the user variable SRVRSEED-xxxxxxxx consisting of the variable identifier SRVR-SEED carrying a server seed;

operating said Telnet client to generate a client seed and, responsive to said user variable name, said user password, server seed and client seed, to form an encrypted password; and communicating from said Telnet client to said Telnet server a sub-negotiation NEW-ENVIRON IS response including an encrypted password and said client seed carryied with said SRVRSEED variable identifier and said user variable name.

6. Method for receiving at a server system an encrypted user password from a client system, comprising the steps of:

communicating to said client an invitation to engage in new environment negotiations;

receiving from said client a response indicating willingness to engage in new environment negotiations;

communicating to said client a request for a user variable name, said request including a server seed;

receiving from said client said user variable name including a client seed and said encrypted password;

operating said server using said server seed, said client seed and said user variable name to decrypt said encrypted password.

7. Method for encrypting and communicating a user password from a client system to a server system, comprising the steps of:

receiving from said server an invitation to engage in new environment negotiations;

communicating from said client to said server a willingness to engage in new environment negotiations;

receiving from said server a request for a user variable name, said request including a server seed;

generating a client seed and, responsive to said user password, user variable name, server seed and client seed, forming an encrypted password; and communicating to said server said user variable name including said encrypted password and said client seed.

8. System for communicating encrypted user passwords from a client to a server, comprising:

means responsive during new environment negotiations for communicating from the server to the client a server random seed value;

means at said client for generating a client random seed value and, using said user variable name, said client random seed value and said server random seed value, an encrypted user password;

means for communicating from said client to said server said client random seed, said user variable name and said encrypted user password; and means at said server for validating said encrypted user password using said server random seed, said client random seed and said user variable name.

9. A program storage device readable by a client machine, tangibly embodying a program of instructions executable by a machine to perform method steps for encrypting and communicating to a server a user password, said method steps comprising:

receiving from said server an invitation to engage in new environment negotiations;

communicating from said client to said server a willingness to engage in new environment negotiations;

receiving from said server a request for a user variable name, said request including a server seed;

generating a client seed and, responsive to said user password, user variable name, server seed and client seed, forming an encrypted password; and communicating to said server said user variable name including said encrypted password and said client seed.

10. An article of manufacture comprising:

a computer usable medium having computer readable program code means embodied therein for encrypting and communicating to a server a user password, the computer readable program means in said article of manufacture comprising:

computer readable program code means for causing a computer to effect receiving from said server an invitation to engage in new environment negotiations;

computer readable program code means for causing a computer to effect communicating from said client to said server a willingness to engage in new environment negotiations;

computer readable program code means for causing a computer to effect receiving from said server a request for a user variable name, said request including a server seed;

computer readable program code means for causing a computer to effect generating a client seed and, responsive to said user password, user variable name, server seed and client seed, forming an encrypted password; and computer readable program code means for causing a computer to effect communicating to said server said user variable name including said encrypted password and said client seed.

11. Method for communicating an encrypted user password over a wide area network from a nurse data device used by a nurse to maintain a database of patient information at a server system, comprising the steps of:

during new environment negotiations, communicating from the server to said nurse data device a server random seed value;

generating at said nurse data device a device random seed value and, using both said device random seed value, said server random seed value, and nurse identifier, an encrypted user password;

communicating from said nurse data device to said server said device random seed, said encrypted user password and said nurse identifier; and at said server, validating said encrypted user password using said server random seed, said device random seed and said nurse identifier.

* * * * *